United States Patent
Li

(10) Patent No.: US 9,060,188 B2
(45) Date of Patent: Jun. 16, 2015

(54) METHODS AND SYSTEMS FOR LOGGING INFORMATION

(71) Applicant: Comcast Cable Communications, LLC, Philadelphia, PA (US)

(72) Inventor: Hao Li, Marlton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 47 days.

(21) Appl. No.: 14/054,226

(22) Filed: Oct. 15, 2013

(65) Prior Publication Data

US 2015/0106840 A1    Apr. 16, 2015

(51) Int. Cl.
| | |
|---|---|
| *H04N 21/2362* | (2011.01) |
| *H04N 7/088* | (2006.01) |
| *H04N 21/433* | (2011.01) |
| *H04N 21/435* | (2011.01) |
| *H04N 21/236* | (2011.01) |
| *H04N 21/81* | (2011.01) |
| *H04N 21/442* | (2011.01) |

(52) U.S. Cl.
CPC ......... *H04N 21/2362* (2013.01); *H04N 7/0882* (2013.01); *H04N 21/433* (2013.01); *H04N 21/435* (2013.01); *H04N 21/23614* (2013.01); *H04N 21/8126* (2013.01); *H04N 21/4424* (2013.01); *H04N 21/442* (2013.01)

(58) Field of Classification Search
CPC .......................... H04N 21/442; H04N 21/4424
USPC ................. 725/32, 136, 139, 142; 348/432.1, 348/434.1, 435.1
See application file for complete search history.

(56) References Cited

U.S. PATENT DOCUMENTS

| | | | | |
|---|---|---|---|---|
| 5,703,795 | A * | 12/1997 | Mankovitz .................... | 715/721 |
| 6,055,023 | A * | 4/2000 | Rumreich et al. ............ | 348/553 |
| 8,484,515 | B2 * | 7/2013 | Adams ............................ | 714/43 |
| 2004/0036806 | A1* | 2/2004 | Katayama ..................... | 348/563 |
| 2010/0220233 | A1* | 9/2010 | Lee ............................... | 348/468 |
| 2014/0118112 | A1* | 5/2014 | Pugel et al. .................. | 340/7.58 |

* cited by examiner

*Primary Examiner* — John Schnurr
(74) *Attorney, Agent, or Firm* — Ballard Spahr, LLP

(57) ABSTRACT

Methods and systems for providing data such as content are disclosed. A method can comprise selecting a closed caption buffer and storing a service trace in the selected closed caption buffer. The closed caption buffer comprising the stored service trace can then be activated to provide service information.

20 Claims, 7 Drawing Sheets

METHODS AND SYSTEMS FOR LOGGING INFORMATION

BACKGROUND

Closed captioning (CC) and subtitling are both processes of displaying text on a television, video screen, or other visual display to provide additional or interpretive information. Closed captions typically show a transcription of the audio portion of a program as it occurs (either verbatim or in edited form), sometimes including non-speech elements. Closed caption information can be encoded within a video signal such as in a buffer or in line 21 of the vertical blanking interval (VBI), for example. A drawback of these conventional techniques is that the text represented by the closed caption information only becomes visible with the use of a decoder. Further, certain devices equipped to decode closed caption information may not be equipped to provide upstream diagnostic feedback. These and other shortcomings are addressed by the present disclosure.

SUMMARY

It is to be understood that both the following summary and the following detailed description are exemplary and explanatory only and are not restrictive, as claimed. Methods and systems for, in one aspect, providing and controlling provision of content delivered to one or more devices, are disclosed. As an example, a data stream can comprise and/or be associated with one or more CC service buffers. As a further example, the data stream can comprise an embedded (e.g., embedded in a CC buffer, stored in a buffer) service trace (e.g., diagnostic trace).

In an aspect, systems can comprise a first closed caption buffer associated with a first closed caption service and a second closed caption buffer associated with a second closed caption service. The second closed caption buffer can comprise a service trace. Upon activation, the first closed caption service can facilitate presentation of content information. Upon activation, the second closed caption service can facilitate presentation of service information.

In an aspect, methods can comprise storing a service trace in a closed caption buffer. A selection of the closed caption buffer can be received. Service information associated with the stored service trace can be transmitted based upon the selection of the closed caption buffer.

In an aspect, methods can comprise receiving closed caption information. The closed caption information can be stored in a first closed caption buffer. A service trace can be received. The service trace can be stored in a second closed caption buffer. A selection of one or more of the first closed caption buffer and the second closed caption buffer can be received. The selection of the first closed caption buffer can facilitate presentation of the closed caption information and selection of the second closed caption buffer can facilitate presentation of service information based on the service trace.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
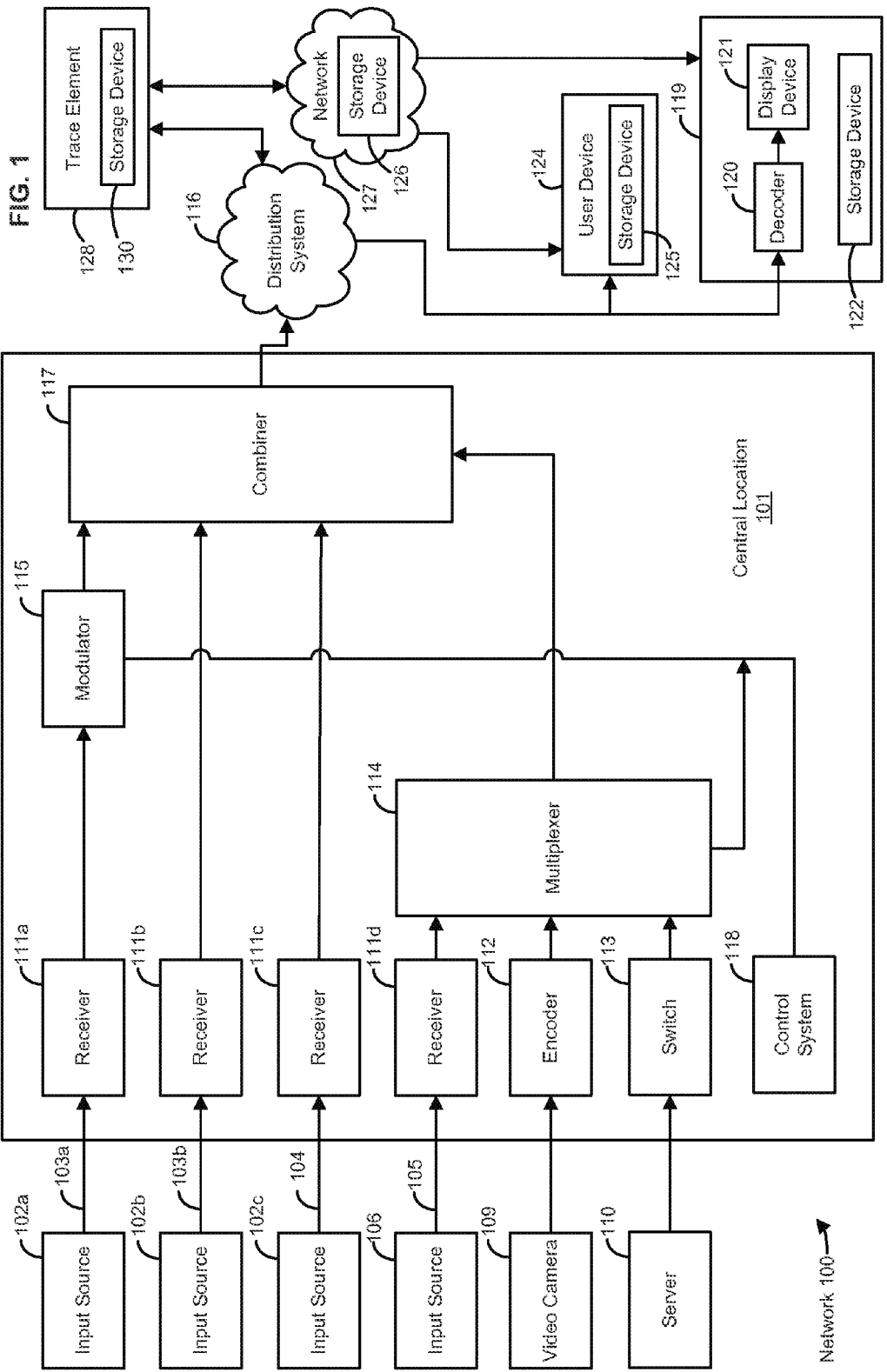
FIG. 1 is a block diagram of an exemplary network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and comprise the disclosed systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for, in one aspect, providing and controlling provision of content delivered to one or more devices, are disclosed. As an example, a data stream can comprise one or more CC service buffers. As a further example, the data stream can comprise an embedded (e.g., embedded in a CC buffer such as a data field) service trace such as a diagnostic trace. The service trace can be received by a device such as a user device or computing device and the service trace can be activated. As an example, a user can enable closed captioning and can select a CC channel (associated with a CC buffer) that comprises the service trace. As such, service information can be provided in response to activating the service trace. Service information can be displayed across a screen of the receiving device in a manner similar to text for closed captioning of audio. The service information can relate to diagnostic information extracted from the receiving device by the service trace.

FIG. 1 illustrates various aspects of an exemplary network environment in which the present methods and systems can operate. Some aspects of the present disclosure relate to methods and systems for content control. Those skilled in the art will appreciate that present methods may be used in systems that employ both digital and analog equipment. One skilled in the art will appreciate that provided herein is a functional description and that the respective functions can be performed by software, hardware, or a combination of software and hardware. Although one or more figures illustrate television content type data, the disclosure can be practiced with any data.

The a network 100 can comprise a central location 101 (e.g., a headend, or processing facility), which can receive content (e.g., data, input programming) from multiple sources. The central location 101 can combine the content from the various sources and can distribute the content to user (e.g., subscriber) locations (e.g., location 119) via a distribution system 116.

In an aspect, the central location 101 can be a data processing facility configured to receive content from a variety of sources 102a, 102b, 102c. The content can be transmitted from the source to the central location 101 via a variety of transmission paths, including wireless (e.g. satellite paths 103a, 103b) and terrestrial path 104. The central location 101 can also receive content from a direct feed source 106 via a direct line 105. Content may also be created at the central location 101. Other input sources can comprise capture devices such as a video camera 109 or a server 110. The signals provided by the content sources can comprise a single content item or a multiplex that comprises several content items.

The central location 101 can comprise one or a plurality of receivers 111a, 111b, 111c, 111d that are each associated with an input source. For example, MPEG encoders, such as an encoder 112, are included for encoding/transcoding local content or a video camera 109 feed. As a further example, a data packaging device, such as a fragmentor, can be integrated with the encoder 112 (or separate and in communication with the encoder 112) to package the encoded/transcoded content. In an aspect, the encoder 112 and/or fragmentor can repeatedly embed markers, flags, and signals into the content data stream for processing by downstream devices. A switch 113 can provide access to a server 110, which can be, for example, a pay-per-view server, a data server, an internet router, a network system, and/or a phone system. Some signals may require additional processing, such as signal multiplexing, prior to being modulated. Such multiplexing can be performed by a multiplexer (mux) 114.

The central location 101 can comprise one or a plurality of modulators 115 for interfacing to the distribution system 116. The modulators can convert the received content into a modulated output signal suitable for transmission over the distribution system 116. The output signals from the modulators can be combined, using equipment such as a combiner 117, for input into the distribution system 116.

A control system 118 can permit a system operator to control and monitor the functions and performance of network 100. The control system 118 can interface, monitor, and/or control a variety of functions, including, but not limited to, the channel lineup for the television system, billing for each user, and/or conditional access for content distributed to users. The control system 118 can provide input to the modulators for setting operating parameters, such as system specific MPEG table packet organization or conditional access information. The control system 118 can be located at central location 101 or at a remote location.

The distribution system 116 can distribute signals from the central location 101 to user locations, such as user location 119. The distribution system 116 can be an optical fiber network, a coaxial cable network, a hybrid fiber-coaxial network, a wireless network, a satellite system, a direct broadcast system, or any combination thereof. There can be a multitude of user locations connected to distribution system 116. At user location 119, a decoder 120, such as a gateway or communications terminal (CT) can decode, if needed, the signals for display on a display device, such as on a display device 121 such as a television set (TV), a mobile device, or a computer monitor. Those skilled in the art will appreciate that the signal can be decoded in a variety of equipment, including a CT, a computer, a TV, a monitor, or satellite dish. In an exemplary aspect, the methods and systems disclosed can be located within, or performed on, one or more CT's, display devices (e.g., display device 121), central locations 101, DVR's, home theater PC's, and the like. As an example, the decoder 120 can receive and process the embedded markers, flags, and signals in the content data stream for controlling a content received by the decoder 120.

In an aspect, the decoder 120 or communication terminal can comprise a storage device 122. As an example, the storage device 122 can comprise a memory or other storage medium. As a further example, a number of content assets (e.g., video, audio, etc.) can be loaded into the storage device 122 and stored for playback or processing by the associated decoder 120. However, other data, content, and/or information can be stored in the storage device 122 such as advertisements and alternative content, for example. In an aspect, the storage device 122 can be separate from the decoder 120. For example, the storage device 122 can be located upstream of the decoder 120 and downstream of the distribution system 116. As a further example, the storage device 122 can store information to be transmitted to any number of decoders 120 or other recipient devices. Accordingly, the decoder 120 can retrieve the content assets from the storage device 122 for playback without having to communicate with the distribution system 116, thereby reducing latency in playback. In an aspect, the decoder 120 can process a data stream, which can comprise audio, video, or other data from the distribution system 116 with a regular cadence (e.g., every two seconds, four seconds, ten seconds, and the like). Other data and tracks can be received and processed by the user devices.

In an aspect, user location 119 is not fixed. By way of example, a user can receive content from the distribution system 116 on a mobile device, such as a laptop computer, PDA, smartphone, GPS, vehicle entertainment system, portable media player, and the like.

In an aspect, a user device 124 can receive signals from the distribution system 116 for rendering content on the user device 124. As an example, rendering content can comprise providing audio and/or video, displaying images, facilitating an audio or visual feedback, tactile feedback, and the like. However, other content can be rendered via the user device 124. In an aspect, the user device 124 can be a CT, a set-top box, a QAM capable device, a television, a computer, a smartphone, a laptop, a tablet, a multimedia playback device, a portable electronic device, and the like. As an example, the user device 124 can be an Internet Protocol compatible device for receiving signals via a network such as the Internet or some other communications network for providing content to the user. As a further example, the user device 124 can comprise software for decoding VBI information such as a VBI embedded service trace. It is understood that other display devices and networks can be used. It is further understood that the user device 124 can be a widget or a virtual device for displaying content in a picture-in-picture environment such as on the display device 121, for example. As an example, a storage device 125 can be in communication with one or more of the user device 124 and the central location 101 to send/receive content therebetween. As a further example, the storage device 125 can be located remotely from the user device 124, such as a network storage device 126.

In an aspect, a trace element 128 can be in communication with one or more of the decoder 120 and the user device 124 to provide information thereto. In another aspect, the trace element 128 can comprise an encoder configured to combine closed captioning data (closed caption data) with the content (e.g., video) data. As an example, the trace element 128 can provide NTSC (or PAL) video with decoded video and closed captioning data on a vertical blanking interval (VBI). For film mode support, a buffer adapted to hold data corresponding to a frame after next may be used. As a further example, the format for embedding closed captioning data in user data can be defined in industry standards such as the Advanced Television Systems Committee (ATSC) standard ATSC 53 and the Electronic Industries Alliance (EIA) standard EIA708. Some formats include EIA608 closed captioning data. In an exemplary aspect, the closed captioning data delivered to the trace element 128 can comprise EIA608 closed captioning data.

In an aspect, the closed captioning data encoded by the trace element 128 can comprise logging data such as a service trace (e.g., diagnostic trace, VBI encoded trace). In another aspect, the trace element 128 can comprise a storage device 130 configured to store data such as one or more service traces. As an example, the service trace can relate to memory usage, error codes, and/or action alerts. As a further example, the service trace can be decoded in a similar manner to that of closed captioning data in order to cause the display of requested information. As an example, the user can select the correct closed captioning options and/or capture the real time closed captioning text into a file or stream for future analysis. The closed captioning text can relate to the requested information associated with the service trace. Requested information can comprise resource (e.g. CPU) usage information, memory available, key press information, channel change information, thread/task information, and the like. The requested information can be provided in various formats including a textual display, for example: |system time|thread|thread stack information, total memory, free memory|.

Figure 2:
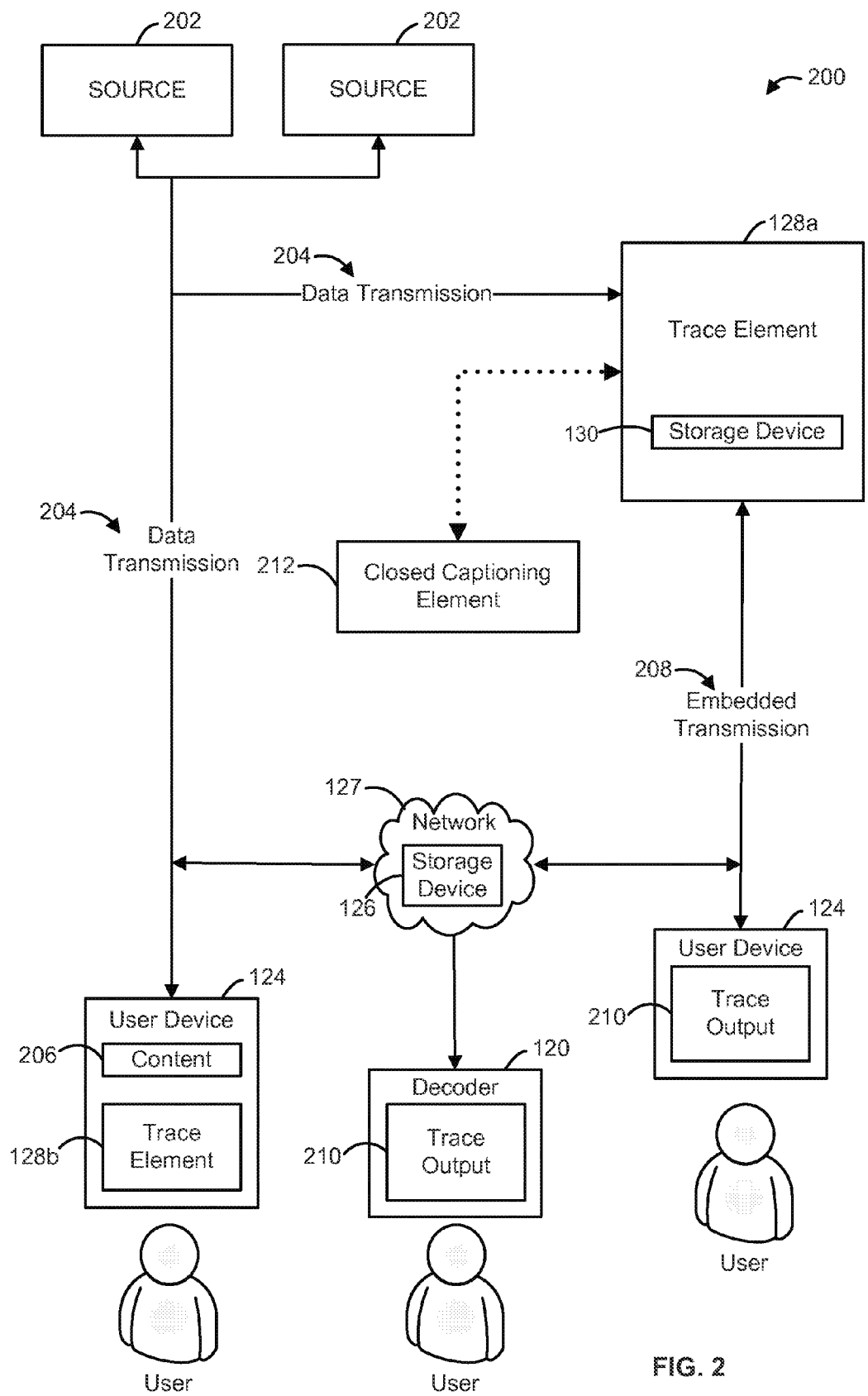
FIG. 2 is a block diagram of an exemplary system.

FIG. 2 is a block diagram of an exemplary content control system 200. The system 200 can comprise one or more data sources 202 for accessing, storing, and/or transmitting data, e.g. a stream of file-based data. As an example, one or more of the sources 202 can be a large area (wide area), such as a national programming source, or a small area (local area) such as a local programming source (e.g., local affiliate). In an aspect, one or more of the sources 202 can comprise content delivery networks (CDN). In another aspect, the data sources 202 can comprise a content provider (e.g., provider of audio content, video content, data services, news and programming, advertisements, alternate content, etc.) configured to transmit the data (e.g., as content assets via a stream, fragments, files, etc.) to various end-users.

In an aspect, one or more sources 202 can process and/or transmit data 204 to one or more network devices such as user devices 124 and/or decoder 120. As another example, a storage medium facilitates storage of at least a portion of the data 204 such as by network storage device 126. Any portion of the data 204 can be stored locally to a receiving device (e.g. user device 124, decoder 120, etc.) or remotely from the receiving device. As a further example, the receiving device can process the data 204 to provide content 206 to a user. In an aspect, content 206 that is provided based on a processing (e.g., rendering or otherwise presenting) of the data 204 can be substantially similar to content provided to other devices and users receiving and/or processing the same data 204 or copies thereof.

In an aspect, one or more trace elements 128a, 128b can be in communication with one or more of the sources 202, the decoder 120, and the user devices 124. As an example, trace element 128b can be co-located and/or integrated with one or more of the sources 202, the decoder 120, and the user devices 124. One or more trace elements 128a, 128b can be disposed in any location or part of any network architecture. In another aspect, the trace element 128 can be in communication with one or more of the decoder 120 and the user device 124 to provide information thereto. In another aspect, the trace element 128 can comprise an encoder configured to combine closed captioning data with the content (e.g., video) data in an embedded transmission 208. As an example, the trace element 128 can provide NTSC (or PAL) video with decoded video and closed captioning data on a vertical blanking interval (VBI). For film mode support, a buffer adapted to hold data corresponding to a frame after next may be used. As a further example, the format for closed captioning data in user data can be defined in industry standards such as the Advanced Television Systems Committee (ATSC) standard ATSC 53 and the Electronic Industries Alliance (EIA) standard EIA708. Some formats include EIA608 closed captioning data. In an aspect, the closed captioning data delivered to the trace element 128 can comprise EIA608 closed captioning data.

In an aspect, the closed captioning data encoded by the trace element 128 can comprise one or more of a logging data such as a service trace (e.g., diagnostic trace). In another aspect, the trace element 128 can comprise a storage device 130 configured to store data such as one or more service traces. As an example, the service trace can relate to memory usage, error codes, action alerts, combinations thereof, and the like. As a further example, the service trace can be decoded in a similar manner to that of closed captioning data in order to cause the display of a trace output 210. In an aspect, trace output 210 can comprise a textual display of information relating to the host device (e.g., the decoder 120, the user device 124, etc.) For example, a user can tune a QAM tuner to an input channel associated with closed captioning. The closed captioning can be selected (enabled), such as selecting closed caption channel 4 (CC4). Log information can be displayed on the screen, such as, 123|MainThread-01|CPU usage 25% Total Memory 16 MB Free Memory 3.5 MB.

In an aspect, a closed caption element 212 can form a combined output signal by combining closed caption data with content data received. In another aspect, the combined output signal can be transmitted to the trace element 128a. As an example, the trace element 128a can receive the output from the closed caption element 212, select an available space (e.g., service buffer or field) in the signal, and embed a service trace in the signal.

Figure 3:
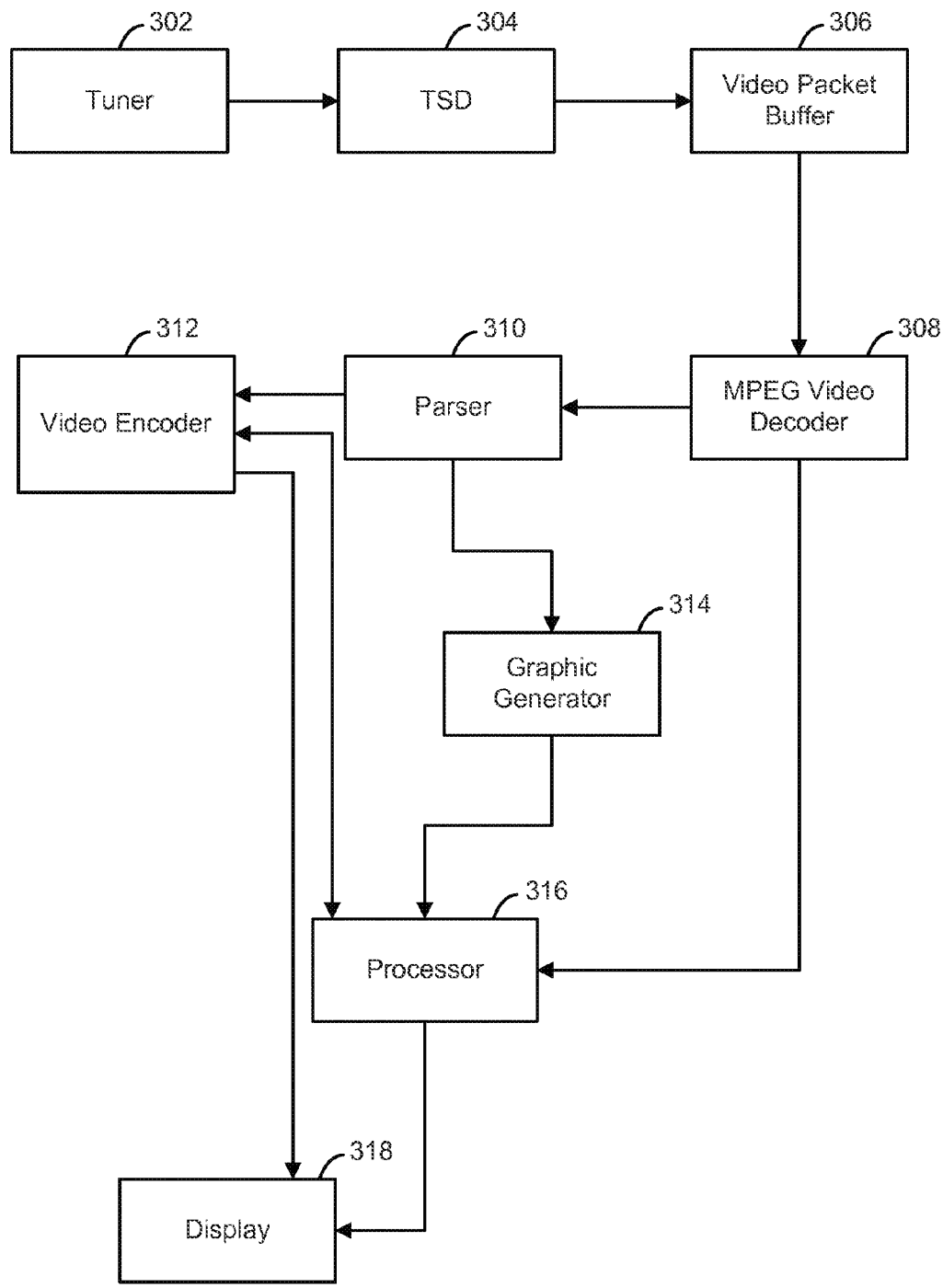
FIG. 3 is a block diagram of an exemplary system.

In an aspect, as shown in FIG. 3, a tuner block 302 can tune to a select frequency and an MPEG transport stream can be delivered to a transport stream demultiplexer (TSD) block 304. The TSD 304 can de-multiplex the MPEG transport digital stream into video data, audio data, and other data (for example, a packet element stream(PES)). The video data and PES data can be delivered to a video packet buffer 306. An MPEG video decoder 308 can be used to decode the video data and to deliver the decoded video data to a display processor 316.

In an aspect, the MPEG video decoder 308 can deliver the PES data, which can be separated from the MPEG video data when decoding the video data, to a user data parser 310. The PES data can comprise closed captioning data in the form of user data. The closed captioning data may be extracted by the user data parser 310. The user data parser 310 can deliver the extracted closed captioning data to a video encoder block 312 and a graphic generator 314. The graphic generator 314 can comprise an on-screen display (OSD) and can deliver graphic and OSD data to the display generator 316. The processor 316 (e.g., display processor), which also receives decoded MPEG video data from the MPEG video decoder block, can combine the graphic and OSD data with the MPEG video data into a digital display signal for display on a display 318. In addition, the display processor can deliver video data to the video encoder 312.

In an aspect, the video encoder 312 can combine the closed captioning data with the video data received and can generate a combined output signal. The combined output signal can be transmitted to a user via a computing device, the processor 316, the display 318, and the like. As an example, the video encoder 312 generates NTSC (or PAL) video with decoded video and closed captioning data on a vertical blanking interval (VBI). The video encoder 312 can be configured to operate as the trace element 128 or configured to comprise the trace element 128. As a further example, the closed captioning data can comprise logging data such as a service trace (e.g., diagnostic trace). For example, software generated service trace(s) can be inserted into a closed captioning buffer (e.g., storage medium, data field, etc.) before encoded in VBI to the RF output. Firmware can search for an empty closed captioning entry for insertion of the service trace. In an aspect, the service trace can relate to memory usage, error codes, action alerts, and the like. As a further example, the service trace can be decoded in a similar manner to that of closed captioning data in order to cause the display of a trace output.

The format for embedding closed captioning data in user data can be defined in industry standards such as the Advanced Television Systems Committee (ATSC) standard ATSC 53 and the Electronic Industries Alliance (EIA) standard EIA708. Some formats include EIA608 closed captioning data. In an aspect, the closed captioning data delivered to the video encoder comprises EIA608 closed captioning data.

Figure 4:
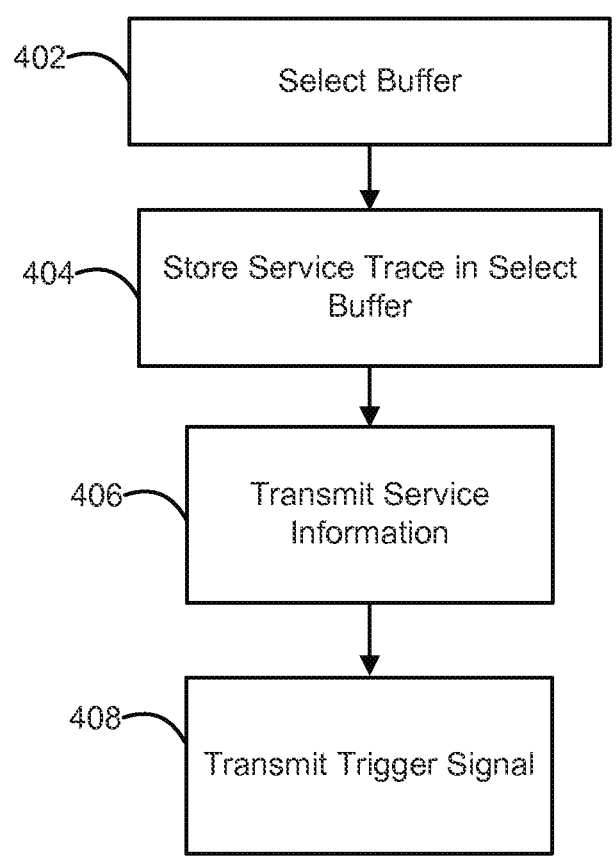
FIG. 4 is a flow chart of an exemplary method.

FIG. 4 illustrates an exemplary method for content placement. In step 402, a closed caption buffer can be selected. In an aspect, one or more service spaces (e.g., buffer) can be provided for storing and/or transmitting information and/or instructions to a device. As an example, the selected closed caption buffer can be associated with an available closed caption service. As a further example, the selected closed caption buffer can be associated with the EIA608 specification and/or the EIA708 specification. The closed caption buffer can be a data field, storage medium, and/or temporary non-transitory memory, for example.

In step 404, a service trace can be stored (e.g., encoded) in the selected closed caption buffer. In an aspect, the service trace can be encoded and stored as part of a transport stream. In another aspect, the service trace can be stored in a memory for subsequent retrieval. As an example, the service trace can relate to memory usage, error codes, action alerts, and the like.

In step 406, service information relating to the service trace can be transmitted. In an aspect, the service trace can be transmitted as part of a transport stream. As an example, activation of the service trace can cause the service trace to be stored. As a further example, the service trace can be stored in a buffer and subsequently activated in order to cause the service information to be transmitted. In another aspect, a trigger signal can be transmitted to facilitate activation of the service trace, at 408. As an example, the service trace and the trigger signal can be transmitted to the same recipient device. As a further example, the trigger signal can comprise a correct message. In an aspect, the correct message can be a notification transmitted via MPEG transport. In another aspect, the correct message can be a unicast message carried in MPEG transport stream to turn the CC logging feature ON or OFF, for example, from a central location (e.g., headend). In an aspect, the service trace can be decoded in a similar manner to that of closed caption data in order to cause the display of requested information. As an example, the user can select the correct closed caption options and/or capture the real time closed caption text into a file or stream for future analysis. The closed caption text can relate to the requested information associated with the service trace. Requested information can comprise resource (e.g., CPU) usage information, memory available, key press information, channel change information, thread/task information, and the like. The requested information can be provided in various formats including a textual display, for example: |system time|thread|thread stack information, total memory, free memory|.

Figure 5A:
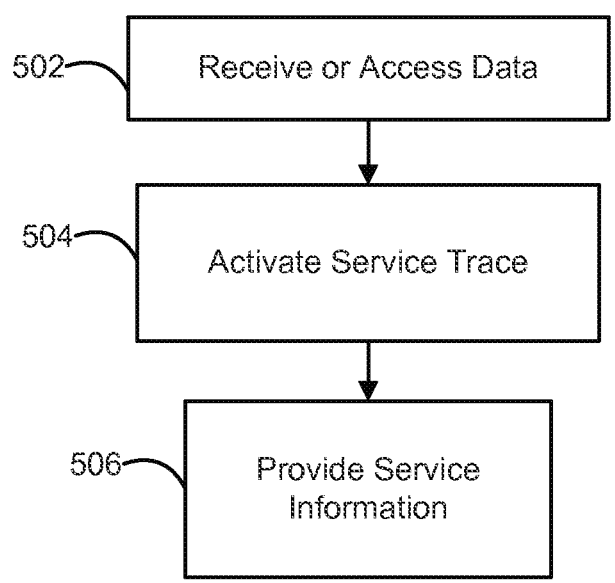
FIG. 5A is a flow chart of an exemplary method.

FIG. 5A illustrates another exemplary method for content placement. In step 502, data (e.g. service trace) and/or a signal can be received or accessed. As an example, the data/signal can comprise a transport stream. In an aspect, the received data/signal can comprise a service trace. In another aspect, the service trace can be stored in a closed caption buffer (e.g. data field) of the received data/signal. As an example, the closed caption buffer can be associated with the EIA608 specification or the EIA708 specification. As an example, the service trace can relate to memory usage, error codes, action alerts, and the like.

In step 504, the service trace can be activated. In an aspect, activating the service trace can comprise receiving a trigger signal to facilitate activation of the service trace. As an example, the trigger signal can comprise a correct message. As another example, activation of the service trace can comprise storage of the service trace in a buffer. As a further example, activation of the service trace can cause service information to be presented to a user. In an aspect, the correct message can be a notification transmitted via MPEG transport. In another aspect, the correct message can be a unicast message carried in MPEG transport stream to turn the CC logging feature ON or OFF, for example, from a central location (e.g., headend). In an aspect, the service trace can be decoded in a similar manner to that of closed caption data in order to cause the display of requested information. As an example, the user can select the correct closed caption options and/or capture the real time closed caption text into a file or stream for future analysis. The closed caption text can relate to the requested information associated with the service trace.

In step 506, service information can be provided in response to activating the service trace. In an aspect, service information can comprise resource (CPU) usage information, memory available, key press information, channel change information, thread/task information, and the like. The service information can be provided in various formats including a textual display, for example: |system time|thread|thread stack information, total memory, free memory|. As a further example, the service information can be displayed as other closed caption information would be displayed.

Figure 5B:
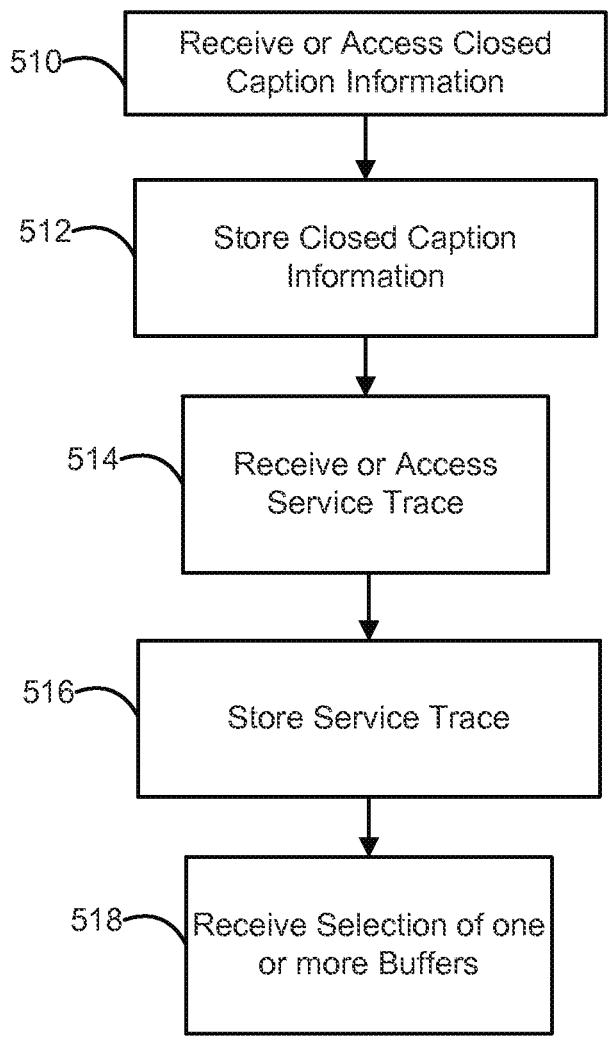
FIG. 5B is a flow chart of an exemplary method.

FIG. 5B illustrates another exemplary method for content placement. In step 510, closed caption information can be received or accessed. In an aspect, the closed caption information can be received via a transport stream. As an example, the closed caption information can be associated with the EIA608 specification or the EIA708 specification.

In step 512, the closed caption information can be stored in a first closed caption buffer. In an aspect, the first closed caption buffer can comprise a non-transitory memory. As an example, the first closed caption buffer can comprise a temporary storage medium. As a further example, the first closed caption buffer can be one of a plurality of selectable (e.g., tunable) buffers.

In step 514, a service trace can be received or accessed. As an example, the service trace can be received via a transport stream. In an aspect, the service trace can be received in a data field of a signal. As an example, the service trace can be associated with the EIA608 specification or the EA708 specification. As an example, the service trace can relate to memory usage, error codes, action alerts, and the like.

In step 516, the service trace can be stored in a second closed caption buffer. In an aspect, the second closed caption buffer can comprise a non-transitory memory. As an example, the second closed caption buffer can comprise a temporary storage medium. As a further example, the second closed caption buffer can be one of a plurality of selectable (e.g., tunable) buffers. Storing the service trace in the second closed caption buffer can be executed based on a trigger signal (e.g., correct message).

In step 518, a selection of one or more of the first closed caption buffer and the second closed caption buffer can be received. In an aspect, selection of the first closed caption buffer can facilitate presentation of the closed caption information. In another aspect, selection of the second closed caption buffer can facilitate presentation of service information based on the service trace. One or more of the closed caption information and the service information can be presented via a vertical blanking interval.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, and/or distributed computing environments that comprise any of the above systems or devices.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Figure 6:
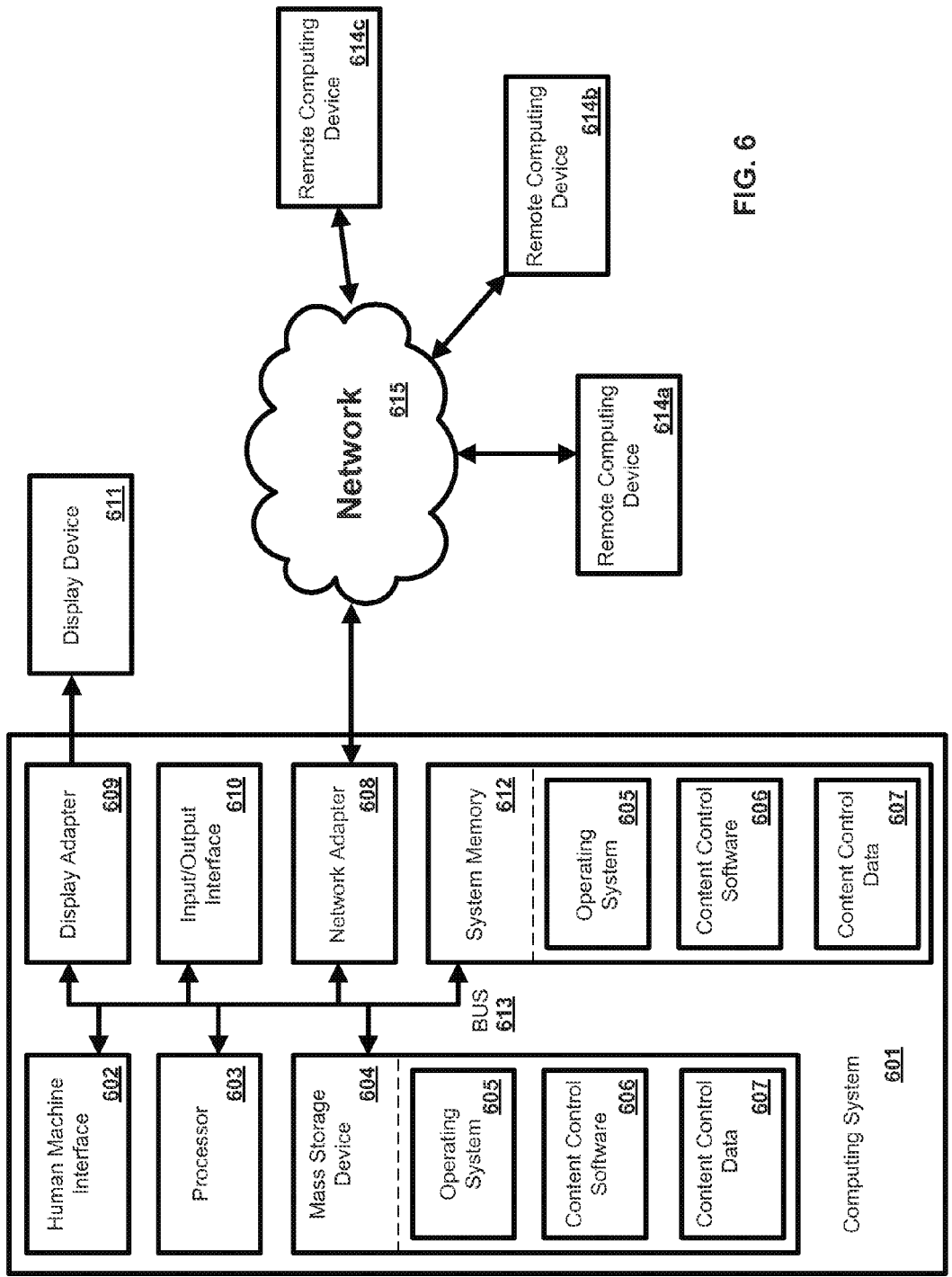
FIG. 6 is a block diagram of an exemplary computing system.

FIG. 6 illustrates a computing system 601. In an aspect, the systems and methods disclosed herein can be implemented via a general-purpose computing device in the form of the computing system 601. The components of the computing system 601 can comprise, but are not limited to, one or more processors or processing units 603, a system memory 612, and a system bus 613 that couples various system components including the processor 603 to the system memory 612. In the case of multiple processing units 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, content control software 606, content control data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computing system 601 typically comprises a variety of computer readable media. Exemplary readable media can be any available media that is accessible by the computing system 601 and comprises, for example and not meant to be limiting, both volatile and non-volatile media, and removable and non-removable media. The system memory 612 comprises computer readable media in the form of volatile memory, such as random access memory (RAM), and/or non-volatile memory, such as read only memory (ROM). The system memory 612 typically contains data such as content control data 607 and/or program modules such as operating system 605 and content control software 606 that are immediately accessible to and/or are presently operated on by the processing unit 603.

In another aspect, the computing system 601 can also comprise other removable/non-removable, and volatile/non-volatile computer storage media. By way of example, FIG. 6 illustrates a mass storage device 604 that can provide non-volatile storage of computer code, computer readable instructions, data structures, program modules, and other data for the computing system 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and content control software 606. Each of the operating system 605 and content control software 606 (or some combination thereof) can comprise elements of the programming and the content control software 606. Content control data 607 can also be stored on the mass storage device 604. Content control data 607 can be stored in any one or more databases known in the art. Examples of such databases comprise. DB2®, Microsoft® Access, Microsoft® SQL Server, Oracle®, mySQL, PostgreSQL, and the like. The databases can be centralized or distributed across multiple systems. In an aspect, content control data 607 can comprise information relating to events, event notifiers, placement spots, alternate programming, programming blackout, advertisements, and the like. As an example, the content control data can comprise information relating to a particular programming being transmitted to a user location. As a further example, the content control data can comprise information and instructions related to processing placement signals and updating content being transmitted to a user location. However, other information can be associated with the content control data, such as information about the subscriber consuming the content including location, device type, and subscription information, and information relating the content for blackouts including blackout locations and alternative content associated with the blackout.

In another aspect, the user can enter commands and information into the computing system 601 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computing system 601 can have more than one display adapter 609 and the computing system 601 can have more than one display device 611. For example, a display device can be a monitor, an LCD (Liquid Crystal Display), or a projector. In addition to the display device 611, other output peripheral devices can comprise components such as speakers (not shown) and a printer (not shown) which can be connected to the computing system 601 via Input/Output Interface 610. Any step and/or result of the methods can be output in any form to an output device. Such output can be any form of visual representation, including, but not limited to, textual, graphical, animation, audio, tactile, and the like. The display 611 and computing system 601 can be part of one device, or separate devices.

The computing system 601 can operate in a networked environment using logical connections to one or more remote computing devices 614a,b,c. By way of example, a remote computing device can be a personal computer, portable computer, smartphone, a server, a router, a network computer, a peer device or other common network node, and so on. Logical connections between the computing system 601 and a remote computing device 614a,b,c can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components such as the operating system 605 are illustrated herein as discrete blocks, although it is recognized that such programs and components reside at various times in different storage components of the computing system 601, and are executed by the data processor(s) of the computer. An implementation of content control software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and communications media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A system comprising:
   a first closed caption buffer associated with a first closed caption service; and
   a second closed caption buffer associated with a second closed caption service, the second closed caption buffer comprising a service trace,
   wherein, upon activation, the first closed caption service facilitates presentation of content information, and
   wherein, upon activation, the second closed caption service facilitates presentation of service information.

2. The system of claim 1, wherein the second closed caption buffer is associated with an EIA-608 specification or an EIA-708 specification.

3. The system of claim 1, wherein the service trace is activated by a trigger signal.

4. The system of claim 3, wherein the trigger signal comprises a correct message.

5. The system of claim 1, wherein the service information comprises one or more of a memory usage, an error code, or an action alert.

6. The system of claim 1, wherein the service information is presented via a vertical blanking interval.

7. A method comprising:
   storing a service trace in a closed caption buffer;
   receiving a selection of the closed caption buffer; and
   transmitting service information associated with the stored service trace based upon the selection of the closed caption buffer.

8. The method of claim 7, wherein the storing the service trace in the closed caption buffer is executed based on a trigger signal.

9. The method of claim 8, wherein the trigger signal comprises a correct message.

10. The method of claim 7, wherein the closed caption buffer is associated with an available closed caption service.

11. The method of claim 7, wherein the closed caption buffer is associated with an EIA-608 specification or an EIA-708 specification.

12. The method of claim 7, wherein the closed caption buffer is disposed in a transport stream.

13. The method of claim 7, wherein the receiving the selection of the closed caption buffer comprises activating a closed caption service associated with the closed caption buffer, whereby the service trace stored in the closed caption buffer is activated.

14. The method of claim 7, wherein the service information is transmitted via a vertical blanking interval.

15. A method comprising:
   receiving closed caption information;
   storing the closed caption information in a first closed caption buffer;
   receiving a service trace;
   storing the service trace in a second closed caption buffer; and
   receiving a selection of one or more of the first closed caption buffer or the second closed caption buffer, wherein selection of the first closed caption buffer facilitates presentation of the closed caption information and selection of the second closed caption buffer facilitates presentation of service information based on the service trace.

16. The system of claim 15, wherein one or more of the first closed caption buffer or the second closed caption buffer is associated with an EIA-608 specification or an EIA-708 specification.

17. The system of claim 15, wherein the storing the service trace in the second closed caption buffer is executed based on a trigger signal.

18. The system of claim 17, wherein the trigger signal comprises a correct message.

19. The system of claim 15, wherein the service information comprises one or more of a memory usage, an error code, or an action alert.

20. The system of claim 15, wherein the service information is presented via a vertical blanking interval.

* * * * *